(12) United States Patent
Byrne

(10) Patent No.: US 9,850,849 B2
(45) Date of Patent: Dec. 26, 2017

(54) THRUST REVERSER TERTIARY LOCK

(71) Applicant: ROHR, INC., Chula Vista, CA (US)

(72) Inventor: Stuart Byrne, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 237 days.

(21) Appl. No.: 14/793,429

(22) Filed: Jul. 7, 2015

(65) Prior Publication Data
US 2017/0009705 A1    Jan. 12, 2017

(51) Int. Cl.
*F02K 1/76* (2006.01)
(52) U.S. Cl.
CPC .............. *F02K 1/766* (2013.01); *F02K 1/76* (2013.01); *F02K 1/763* (2013.01); *Y02T 50/671* (2013.01)
(58) Field of Classification Search
CPC ............. F02K 1/766; F02K 1/763; F02K 1/76
See application file for complete search history.

(56) References Cited

U.S. PATENT DOCUMENTS

| | | | | |
|---|---|---|---|---|
| 5,257,840 A | * | 11/1993 | Rouzaud | E05C 3/24 292/201 |
| 5,735,557 A | * | 4/1998 | Harvey | F02K 1/766 239/265.29 |
| 5,997,054 A | * | 12/1999 | Baudu | F02K 1/76 292/201 |
| 6,021,636 A | | 2/2000 | Johnson et al. | |
| 6,260,801 B1 | | 7/2001 | Peters et al. | |
| 6,584,763 B2 | | 7/2003 | Lymons et al. | |
| 6,848,651 B2 | * | 2/2005 | Christensen | F02K 1/766 244/110 B |
| 7,007,454 B2 | | 3/2006 | Hurel | |
| 2014/0116024 A1 | | 5/2014 | Channel | |
| 2014/0131515 A1 | | 5/2014 | Caruel | |
| 2014/0270935 A1 | * | 9/2014 | Willett | F02K 1/766 403/375 |

* cited by examiner

*Primary Examiner* — Steven Sutherland
(74) *Attorney, Agent, or Firm* — Snell & Wilmer, L.L.P.

(57) ABSTRACT

A nacelle may include a tertiary lock for a thrust reverser. The tertiary lock may comprise a locking face which prevents the thrust reverser from accidentally deploying. An actuator may be coupled to a track beam. The actuator may contact a left tertiary lock and a right tertiary lock to disengage the locks. The locks may rotate and allow the thrust reverser to deploy. A spring may bias the locks to engage when the thrust reverser returns to the stowed position.

13 Claims, 6 Drawing Sheets

THRUST REVERSER TERTIARY LOCK

FIELD

The disclosure generally relates to turbofan propulsion systems for aircraft. More particularly, the disclosure relates to a tertiary lock system for use with a translating sleeve of a thrust reverser.

BACKGROUND

Turbine engine thrust reverser systems may include a translating sleeve. By deploying the translating sleeve, the thrust reverser may direct bypass air in a forward direction to create reverse thrust after landing. The translating sleeve slides aft to as deployed position and forward to a stowed position. A tertiary locking system, also referred to as a track lock or a sleeve lock, prevents the translating sleeve from being accidentally deployed during flight. It is called a tertiary lock because at least two other separate lines of defense are typically also required to ensure against accidental translating sleeve deployment. A left translating sleeve and a right translating sleeve may each include a separate tertiary lock with its own actuator. Or, if the left and right translating sleeve are latched together to deploy together, then in some cases only a single tertiary lock is used on either the left or right sleeve and protects both sleeves. While tertiary locks are effective, they add extra weight and cost, and it is difficult to package them in already complex structures and systems. New designs which reduce complexity and weight and provide additional packaging flexibility would be beneficial.

SUMMARY

A tertiary lock assembly for a thrust reverser may comprise a lock pivotable about a pin, the lock comprising a locking face and a stop. In response to a translating sleeve deploying in an aft direction with the lock in an engaged position, the translating sleeve may be configured to apply a torque on the locking face in a first direction about the pin. The stop may be configured to contact a mounting plate and prevent the lock from rotating in the first direction.

In various embodiments, the lock may comprise a ramp. The lock may be configured to rotate in a second direction opposite the first direction to a disengaged position in response to the translating sleeve contacting the ramp. The lock may comprise a disengagement face. A spring may be configured to bias the lock to an engaged position. An actuator may be configured to contact the disengagement face. The actuator may be configured to contact a plurality of locks to disengage the plurality of locks. The lock may be configured to engage without contacting the actuator in response to the translating sleeve translating to the stowed position.

A thrust reverser may comprise a left track beam. A left translating sleeve may be coupled to the left track beam, wherein the left translating sleeve is configured to translate between a stowed position and a deployed position. The thrust reverser may comprise a right track beam. A right translating sleeve may be coupled to the right track beam, wherein the right translating sleeve is configured to translate between a stowed position and a deployed position. An actuator may be coupled to the left track beam. A left tertiary lock assembly may be coupled to the left track beam. A right tertiary lock assembly may be coupled to the right track beam. The actuator may be configured to disengage the left tertiary lock assembly and the right tertiary lock assembly.

In various embodiments, the left tertiary lock assembly may comprise a lock coupled to a mounting plate via a pin. The lock may comprise a locking face configured to interfere with the left translating sleeve, and a stop configured to contact the mounting plate in response to the left translating sleeve applying a force on the locking face. A spring may bias the left tertiary lock assembly to an engaged position. The locking face extend through an aperture in the thrust reverser. The left translating sleeve may be configured to contact a ramp on the lock during forward translation of the left translating sleeve. The lock may rotate in a plane normal to a direction of translation of the left translating sleeve.

A thrust reverser may comprise translating sleeve coupled to a track beam. A tertiary lock may have an engaged position and a disengaged position, and may comprise a locking face configured to contact an engagement feature on the translating sleeve. When the tertiary lock is in the engaged position, deployment of the translating sleeve may create a torque on the tertiary lock in a first direction, wherein pivoting of the tertiary lock in the first direction is blocked by a stop to prevent the translating sleeve from unintentionally deploying. An actuator may be configured to contact a disengagement face of the tertiary lock to pivot the tertiary lock in a second direction opposite the first direction such that the locking face will not interfere with the engagement feature during translating sleeve deployment.

In various embodiments, the thrust reverser may comprise a right tertiary lock, wherein the actuator is configured to disengage the right tertiary lock. The tertiary lock may comprise it ramp, wherein the translating sleeve is configured to contact the ramp during forward translation of the translating sleeve. A spring may be configured to bias the tertiary lock to an engaged position. The locking face may extend through an aperture in the thrust reverser.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
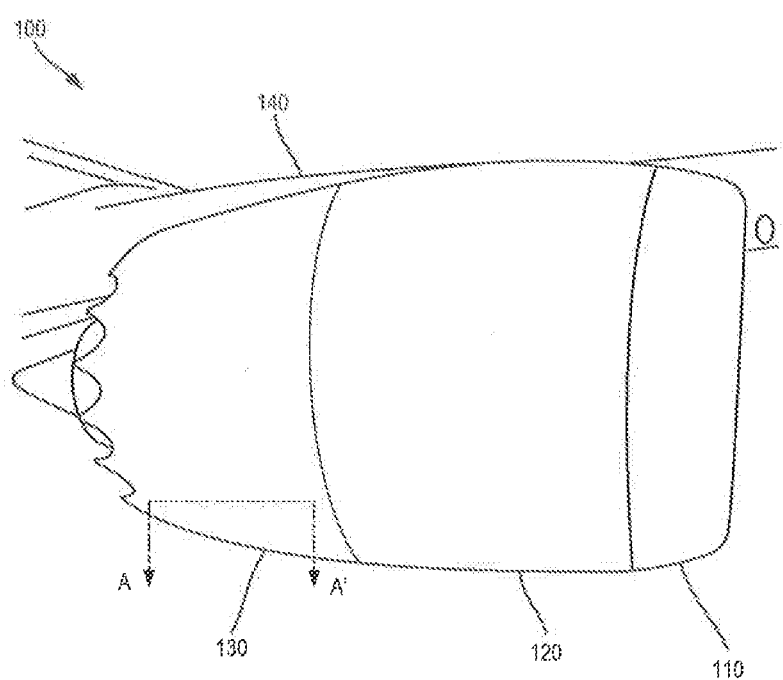
FIG. 1 illustrates a perspective view of a nacelle in accordance with various embodiments of the disclosure.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or stop may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used her in "distal" refers to the direction radially outward, or generally, away from the axis of rotation of a turbine engine. As used herein, "proximal" refers to a direction radially inward, or generally, towards the axis of rotation of a turbine engine.

In various embodiments, a thrust reverser may be configured to direct the flow of bypass air a forward direction, causing reverse thrust. In this regard, a thrust reverser may comprise a translating sleeve which may be configured to translate forward and aft (e.g., to stow and deploy), in a known manner. The translating sleeve may be configured to translate forward and aft adjacent to at least one of a hinge beam (i.e., the upper track beam) and a latch beam (i.e., the lower track beam). Accordingly, a hinge beam and a latch beam may be referred to herein collectively as track beams and/or a track beam. Various lock systems may be used to prevent the translating sleeve from aft translation. A tertiary lock, also known as a "third lock" or a "track lock," may be located between a track beam and a translating sleeve. The tertiary lock may comprise a left lock and a right lock. An actuator may rotate the left lock and the right lock to disengage the tertiary lock and allow the translating sleeve to translate in the aft direction. To stow the translating sleeve, the translating sleeve may contact a ramp on the locks and the translating sleeve may translate forward without the actuator contacting the locks. In response to the translating sleeve translating forward to the stowed position, a spring may rotate the locks into an engaged position, and the locks may prevent the translating sleeve from translating aft without the actuator disengaging the locks.

While the lock systems described herein are described in the context of the latch beam relative to the translating sleeve, one will appreciate that the systems described herein may be used in connection with various other tertiary lock applications, including the hinge beam relative to its adjacent translating sleeve, for example.

Referring to FIG. 1, a nacelle 100 for a gas turbine engine is illustrated according to various embodiments. The nacelle 100 may comprise an inlet 110, a fan cowl 120, and a thrust reverser 130. The nacelle 100 may be coupled, directly or indirectly, to a nylon 140, which may mount the nacelle 100 to an aircraft wing or aircraft body. The thrust reverser 130 may comprise a translating sleeve which translates relative to one or more track beams in order to deploy the thrust reverser 130.

Figure 2:
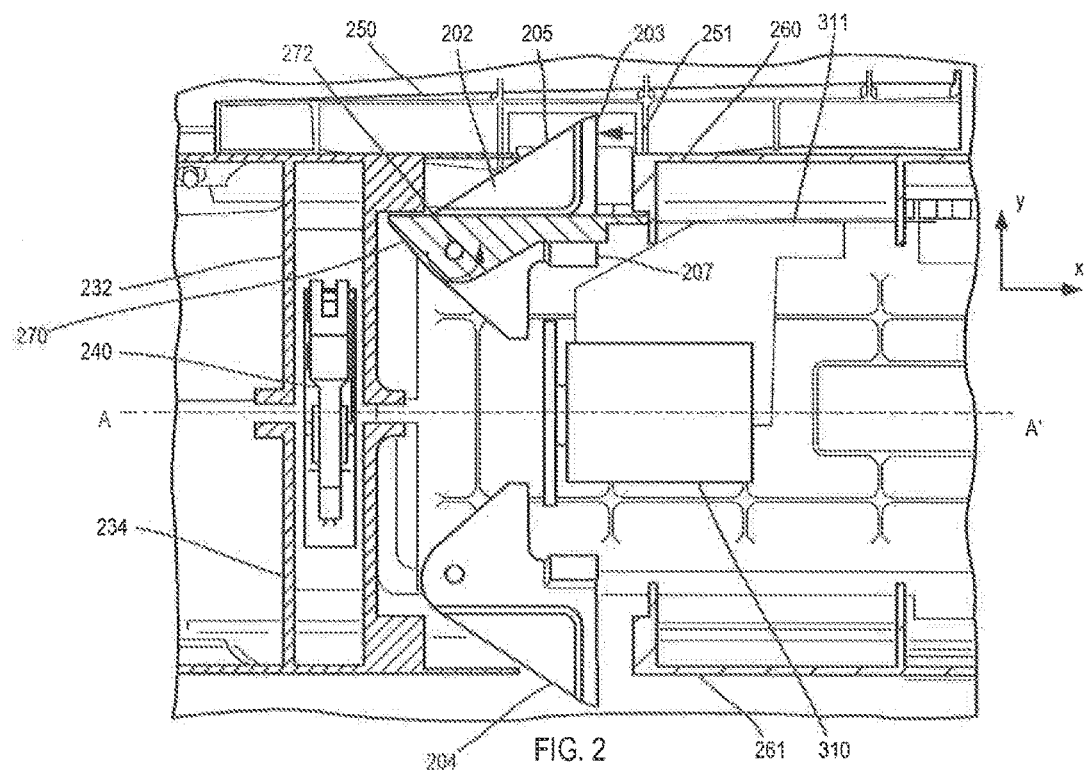
FIG. 2 illustrates a section view of a thrust reverser with a tertiary lock assembly, the thrust reverser in a stowed position in accordance with various embodiments of the disclosure.

Referring to FIG. 2, a section view along A-A' of the thrust reverser in a stowed position with a tertiary lock assembly mounted on a track beam is illustrated in accordance with various embodiments. X-y axes are shown for ease of illustration. A left thrust reverser half 232 and a right thrust reverser half 234 may be coupled together by a latch 240. A left translating sleeve 250 associated with the left thrust reverser half 232 may translate forward (positive x-direction) and aft (negative x-direction) along a left track beam 260. Similarly, a right translating sleeve associated with the right thrust reverser half 234 may translate forward and aft along a right track beam 261. The right translating sleeve associated with the right thrust reverser half 234 is not shown for ease of illustration. The left translating sleeve 250 may be mounted to the left track beam 260. A slider-track assembly, known in the art, may be used to mount the left translating sleeve 250 to the left track beam 260. The left translating sleeve 250 may be configured to translate forward to a stowed position and aft to a deployed position.

A left lock 202 and a right lock 204 may prevent the left translating sleeve 250 from deploying unintentionally. Although generally described and shown with respect to the left lock 202 and left translating sleeve 250, those skilled in the art will recognize that the right lock 204 and the right translating sleeve may operate in a similar fashion. The left lock 202 may be coupled to the left track beam 260 via a mounting plate 270. However, in various embodiments the left lock 202 may be coupled directly to the left track beam 260 without the use of a separate mounting plate, or a mounting plate may be integrally formed with the left track beam 260. The left lock 202 may be configured to rotate within the mounting plate 270 about a pin 272. The left lock 202 may comprise a locking face 203 which extends through an aperture in the of track beam 260. If the left translating sleeve 250 begins to deploy in the aft direction with the left lock 202 engaged, the locking face 203 will contact an engagement feature 251 on the left translating sleeve 250. When the left translating sleeve 250 deploys against the engaged left lock 202, the left translating sleeve 250 will translate a short distance and the contact of the engagement feature 251 on the locking face 203 will create a torque on the left lock 202 about the pin 272. However, the left lock 202 may comprise a stop 207 which will contact the mounting plate 270 and prevent further pivoting of the left lock 202, and thus prevent further translating of the left translating sleeve 250. An actuator 310 may be coupled to the left track beam 260 via a bracket 311. In various embodiments, the actuator 310 may be coupled to the right track beam 261. The actuator 310 may be mounted on one track beam, and the actuator 310 may move into position to be capable of disengaging both the left lock 202 and the right lock 204 when the thrust reverser is closed.

Figure 3:
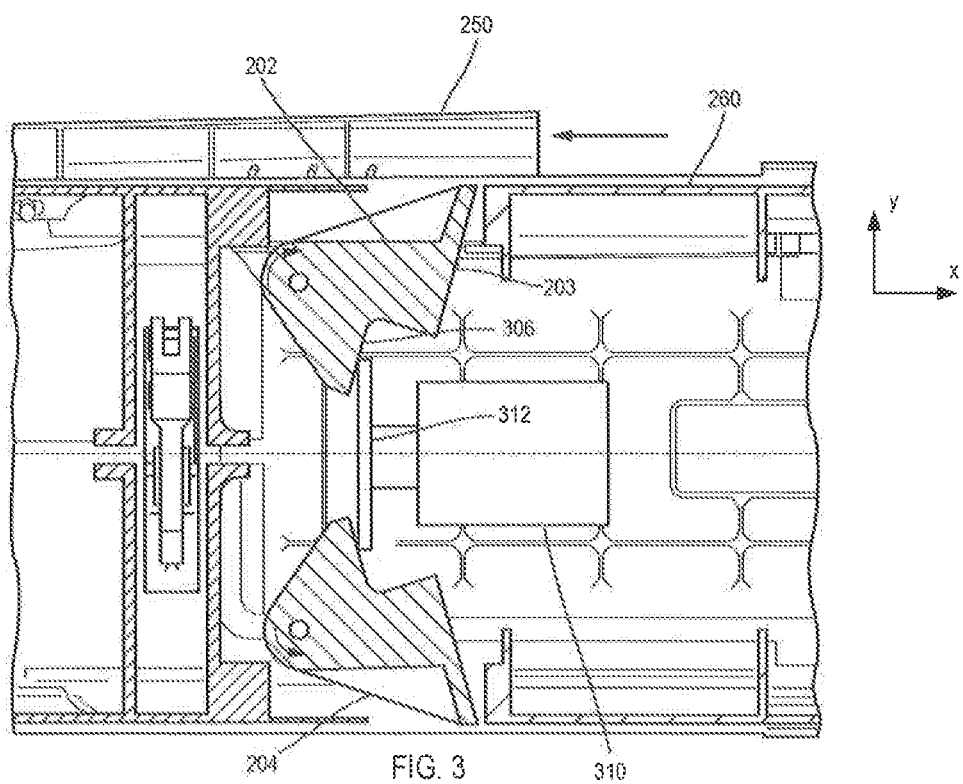
FIG. 3 illustrates a section view of a thrust reverser with a tertiary lock assembly, the thrust reverser in a deployed position in accordance with various embodiments of the disclosure.

Referring to FIG. 3, a section view s of the thrust reverser in a deployed position is illustrated according to various embodiments. The actuator 310 may comprise a solenoid plate 312 configured to translate forward and aft. To disengage the locks 202, 204 the actuator 310 may drive the solenoid plate 312 aft (negative x-direction). The left lock 202 may be configured to rotate in a plane of rotation which may be normal to the direction of translation of the left translating sleeve 250. The solenoid plate 312 may contact a disengagement face 306 on the left lock 202 and the right lock 204 and rotate the locks 202, 204 such that the locking face 203 no longer interferes with the left translating sleeve 250. Thrust reverser actuators may then drive the left translating sleeve 250 in the aft direction to deploy the thrust reverser. As shown, a single actuator 310 may disengage both the left lock 202 and the right lock 204.

Figure 4:
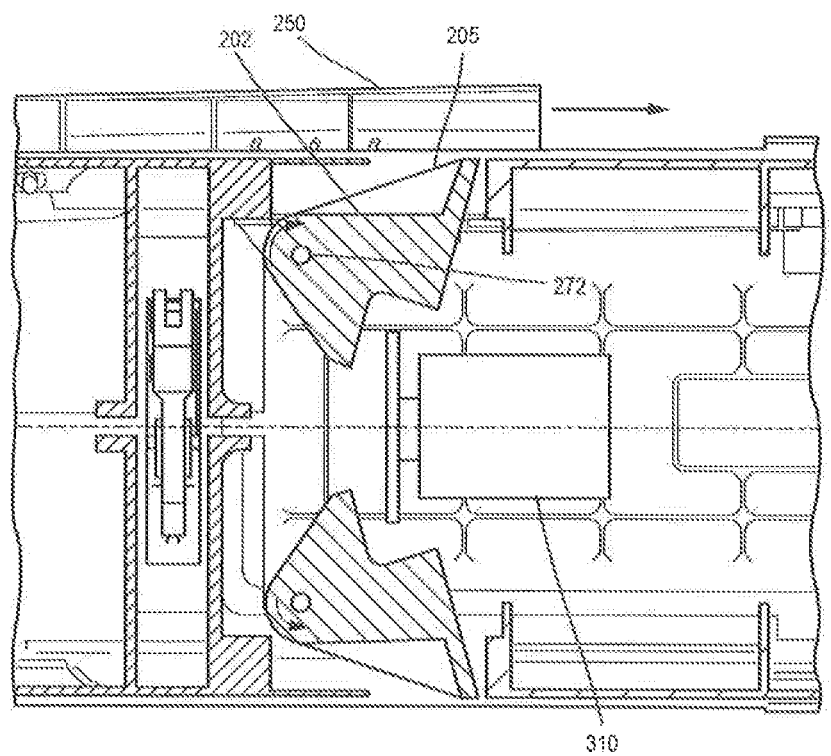
FIG. 4 illustrates a section view of a thrust reverser with a tertiary lock assembly, the thrust reverser in a deployed position moving towards a stowed position in accordance with various embodiments of the disclosure.

Referring to FIG. 4, a section view of the thrust reverser beginning to stow is illustrated according to various embodiments. The left translating sleeve 250 may contact a ramp 205 on the left lock 202 as the left translating sleeve 250 translates in the forward direction toward the stowed position. The contact between the left translating sleeve 250 and the ramp 205 may cause the left lock 202 to rotate about the pin 272 in the direction shown by the arrows and prevent the left lock 202 from interfering with the motion of the left translating sleeve 250. Because the forward motion of the left translating sleeve 250 may keep the left lock 202 disengaged, the left lock 202 may disengage without contact from the actuator 310. Thus, even in the case of failure of the actuator 310, the left translating sleeve 250 may return to the stowed position.

Figure 5:
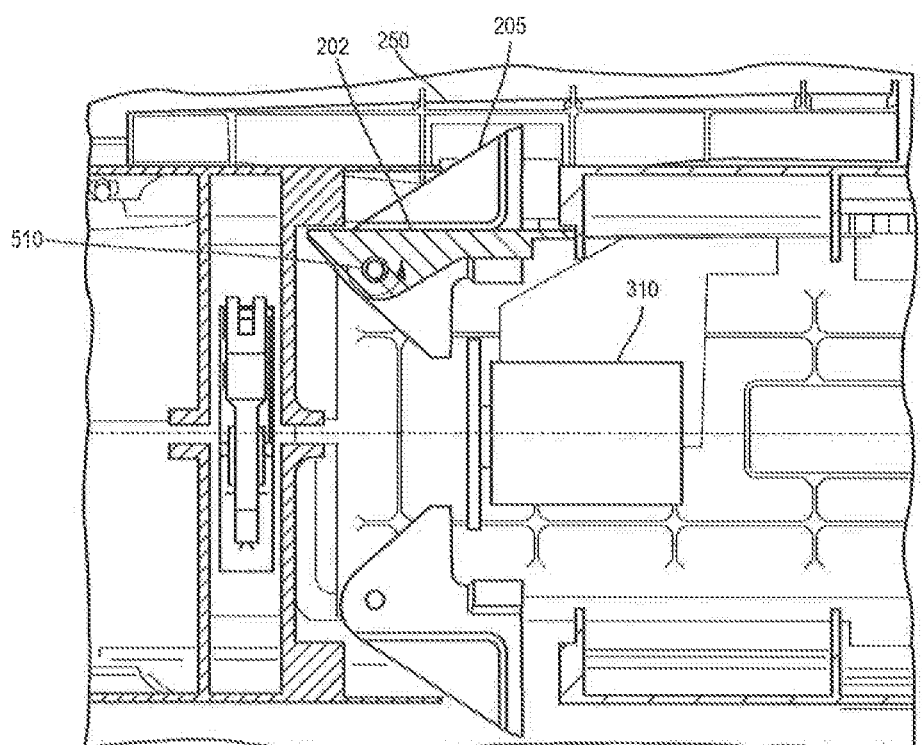
FIG. 5 illustrates a section view of a thrust reverser with a tertiary lock assembly, and the thrust reverser returned to the stowed position in accordance with various embodiments of the disclosure.

Referring to FIG. 5, a section view of the thrust reverser in the stowed position is illustrated according to various embodiments. The left lock 202 may comprise a spring 510, such as a torsion spring, which biases the left lock 202 to the engaged position. Thus, once the left translating sleeve 250 translates to the stowed position, the left translating sleeve 250 may not contact the ramp 205, and the spring 510 may rotate the left lock 202 into the engaged position. The left lock 202 may therefore automatically engage without interaction with the actuator 310.

Figure 6A:
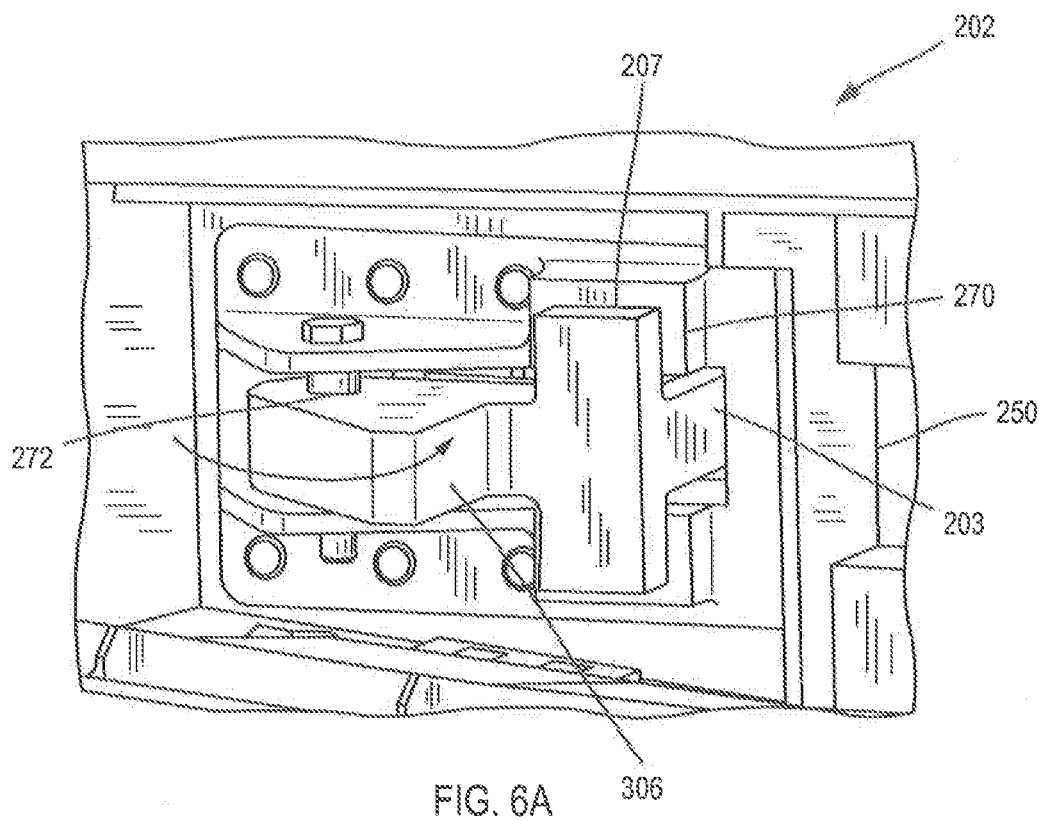
FIG. 6A illustrates a perspective view of a first side of a lock assembly in accordance with various embodiments of the disclosure.
Figure 6B:
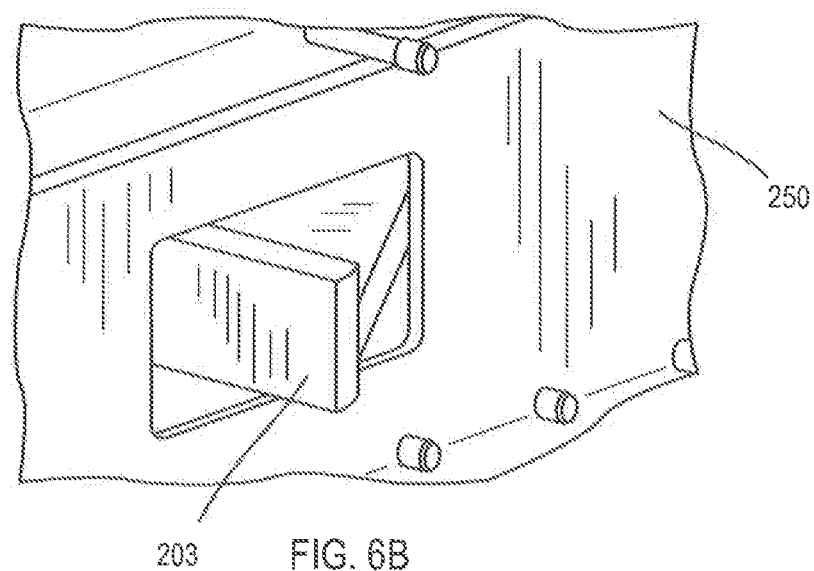
FIG. 6B illustrates a perspective view of a second side of a lock assembly in accordance with various embodiments of the disclosure.

Referring to FIGS. 6A and 6B, a perspective view of the left lock 202 from opposite sides is illustrated according to various embodiments. The left lock 202 may rotate about the pin 272. In the engaged position, if the left translating sleeve 250 begins to translate aft, the left translating sleeve 250 will contact the locking face 203 of the left lock 202. The stop 207 will contact the mounting plate 270 and prevent further rotation of the left lock 202 or translation of the left translating sleeve 250. Force exerted on the left lock 202 from the left translating sleeve 250 may be distributed into the pin 272 and the mounting plate 270 via the stop 207. Thus, the left lock 202 does not apply a force on the actuator via the disengagement face 306 on the left lock 202.

In the detailed description herein, references to "one embodiment", "an embodiment" "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A tertiary lock assembly for a thrust reverser comprising:
    a lock pivotable about a pin, the lock comprising a locking face, a ramp, and a stop;
    wherein, in response to a translating sleeve deploying in an aft direction with the lock in an engaged position, the translating sleeve is configured to apply a torque on the locking face in a first direction about the pin, and wherein the stop is configured to contact a mounting plate and prevent the lock from rotating in the first direction;
    wherein the lock is configured to rotate in a second direction opposite the first direction to a disengaged position in response to the translating sleeve contacting the ramp.

2. The tertiary lock assembly of claim 1, wherein the lock comprises a disengagement face.

3. The tertiary lock assembly of claim 2, further comprising an actuator configured to contact the disengagement face.

4. The tertiary lock assembly of claim 3, wherein the actuator is configured to contact a plurality of locks to disengage the plurality of locks.

5. The tertiary lock assembly of claim 3, wherein the lock is configured to engage without contacting the actuator in response to the translating sleeve translating to a stowed position.

6. The tertiary lock assembly of claim 1, further comprising a spring configured to bias the lock to an engaged position.

7. A thrust reverser comprising:
a left track beam;
a left translating sleeve coupled to the left track beam, wherein the left translating sleeve is configured to translate between a stowed position and a deployed position;
a right track beam;
a right translating sleeve coupled to the right track beam, wherein the right translating sleeve is configured to translate between a stowed position and a deployed position;
an actuator coupled to the left track beam;
a left tertiary lock assembly coupled to the left track beam,
wherein the left tertiary lock assembly comprises a lock coupled to a mounting plate via a pin,
wherein the lock comprises a locking face configured to interfere with the left translating sleeve, and a stop configured to contact the mounting plate in response to the left translating sleeve applying a force on the locking face,
wherein the locking face extends through an aperture in the thrust reverser; and
a right tertiary lock assembly coupled to the right track beam;
wherein the actuator is configured to disengage the left tertiary lock assembly and the right tertiary lock assembly.

8. The thrust reverser of claim 7, further comprising a spring which biases the left tertiary lock assembly to an engaged position.

9. The thrust reverser of claim 7, wherein the left translating sleeve is configured to contact a ramp on the lock during forward translation of the left translating sleeve.

10. The thrust reverser of claim 7, wherein the lock rotates in a plane normal to a direction of translation of the left translating sleeve.

11. A thrust reverser comprising:
a translating sleeve coupled to a track beam;
a tertiary lock having an engaged position and a disengaged position, and comprising a locking face configured to contact an engagement feature on the translating sleeve, wherein the locking face extends through an aperture in the thrust reverser, and when the tertiary lock is in the engaged position, deployment of the translating sleeve will create a torque on the tertiary lock in a first direction, wherein pivoting of the tertiary lock in the first direction is blocked by a stop to prevent the translating sleeve from unintentionally deploying; and
an actuator configured to contact a disengagement face of the tertiary lock to pivot the tertiary lock in a second direction opposite the first direction such that the locking face will not interfere with the engagement feature during translating sleeve deployment.

12. The thrust reverser of claim 11, wherein the tertiary lock comprises a ramp, wherein the translating sleeve is configured to contact the ramp during forward translation of the translating sleeve.

13. The thrust reverser of claim 11, further comprising a spring configured to bias the tertiary lock to an engaged position.

\* \* \* \* \*